United States Patent [19]

Lawson

[11] 4,200,359

[45] Apr. 29, 1980

[54] SIDE VIEW MIRROR ASSEMBLY WITH BUTYL RUBBER ADHESIVE

[76] Inventor: David E. Lawson, 701 Riford Rd., Glen Ellyn, Ill. 60137

[21] Appl. No.: 963,450

[22] Filed: Nov. 24, 1978

[51] Int. Cl.² ........................... A47G 1/17; G02B 5/08
[52] U.S. Cl. ..................................... 350/303; 248/467
[58] Field of Search ....................... 350/303, 304, 307; 248/467

[56] References Cited

FOREIGN PATENT DOCUMENTS

| | | | |
|---|---|---|---|
| 2425502 | 12/1975 | Fed. Rep. of Germany | 350/303 |
| 2441088 | 3/1976 | Fed. Rep. of Germany | 350/303 |
| 2527362 | 12/1976 | Fed. Rep. of Germany | 350/303 |
| 2701781 | 7/1978 | Fed. Rep. of Germany | 350/304 |
| 2756573 | 7/1978 | Fed. Rep. of Germany | 350/303 |

Primary Examiner—Jon W. Henry
Attorney, Agent, or Firm—Andrus, Sceales, Starke & Sawall

[57] ABSTRACT

A mirror assembly for a vehicle. A small, flat mirror is mounted through use of a wedge-shaped adhesive block to the inside portion of a conventional side view mirror. The block positions the small mirror at an angle of about 15° to 20° with respect to the plane of the side view mirror to thereby eliminate the "blind spot" to the side and the rear of the vehicle.

3 Claims, 2 Drawing Figures

SIDE VIEW MIRROR ASSEMBLY WITH BUTYL RUBBER ADHESIVE

BACKGROUND OF THE INVENTION

Most vehicles include an adjustable side view mirror to provide a view along the side and to the rear of the vehicle. There is normally a "blind spot" which can be described as the area just forward of the view of the side view mirror and to the rear of the normal sight of the motorist. If an oncoming vehicle is in this "blind spot", which is adjacent the left rear quarter of the vehicle, the vehicle cannot be seen by the motorist, and turning out or passing can be hazardous.

Various attempts have been made in the past to eliminate the "blind spot", generally by utilizing mirrors of complex curvature. Not only are these mirrors expensive, but they distort the view, making it difficult to properly visualize the distance of the oncoming vehicle.

SUMMARY OF THE INVENTION

The invention is directed to an inexpensive attachment for a conventional side view mirror which eliminates the "blind spot". In accordance with the invention, a small, flat mirror is mounted through use of a wedge-shaped adhesive block to the inside portion of the conventional side view mirror. The block is shaped such that the small mirror is positioned at an angle of about 15° to 20° with respect to the plane of the main mirror. The reflective view of the small mirror is toward the left rear quarter of the vehicle, thereby eliminating the "blind spot" of the conventional side view mirror.

The device of the invention is inexpensive and merely comprises a small flat mirror and the block of adhesive material. As no complex curvatures are required for the small mirror, the cost is substantially reduced over mirrors utilizing complex curvatures.

The small mirror can be readily attached to the conventional side view mirror by merely pressing the adhesive block against the mirror. No auxiliary adhesives are required and the pre-formed shape of the block automatically installs the small mirror at the proper angle.

Other objects and advantages will appear in the course of the following description.

DESCRIPTION OF THE DRAWINGS

The drawings illustrate the best mode presently contemplated of carrying out the invention.

In the drawings.

DESCRIPTION OF THE PREFERRED EMBODIMENT

Figure 1:
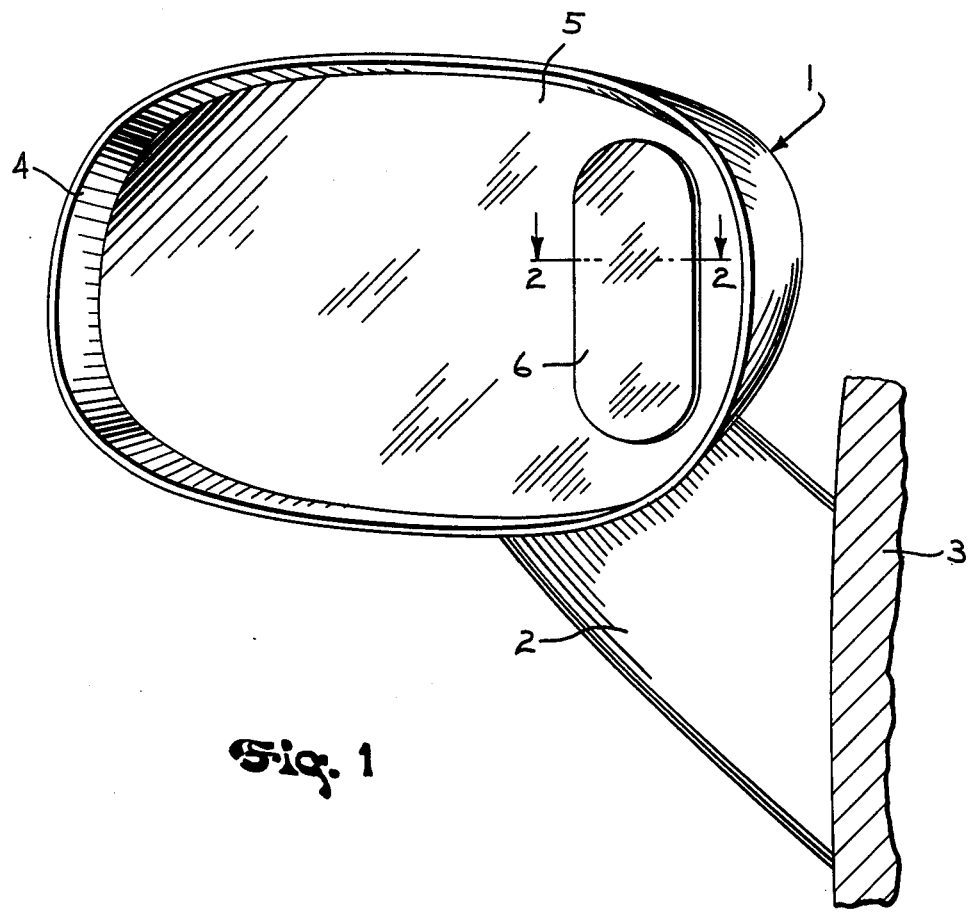
FIG. 1 is a plan view of a conventional side view mirror incorporating the small blind spot mirror of the invention.

The drawings illustrate a side view mirror assembly 1 which is attached through an arm or bracket 2 to the side of a motor vehicle 3, such as an automobile, truck, recreation vehicle, motorcycle, bicycle, or the like. The mirror assembly 1 includes a housing 4, and a flat mirror 5 which is mounted for swiveling movement within the housing in a conventional manner. The position of the mirror 5 can be adjusted either manually or through remote controls from inside the vehicle.

Figure 2:
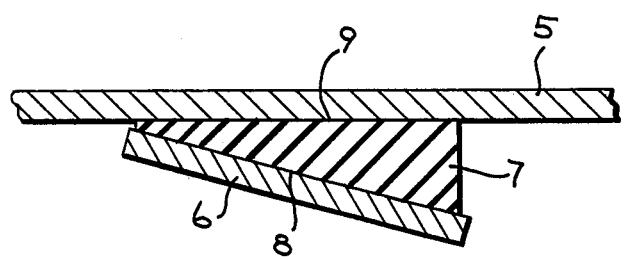
FIG. 2 is a section taken along line 2—2 of FIG. 1.

In accordance with the invention, a small, flat mirror 6 is attached to the mirror 5 through a block of pressure sensitive adhesive material 7. The mirror 6 has an area less than 25% of the area of the large mirror 5. As illustrated in FIG. 2, the small mirror 6 is attached to the mirror 5 on the driver's side of the vehicle, and as such is preferably attached to the inside portion of mirror 5, adjacent the vehicle.

As best shown in FIG. 2, the block is formed with a generally wedge-shaped configuration, having opposite surfaces 8 and 9 which diverge in a direction toward the vehicle. One of the surfaces 8 is attached to the rear of the mirror 6, while the opposite surface 9 is attached to mirror 5. The pre-formed shape of the block 7 properly positions the small mirror at an angle of about 15° to 20° with respect to the plane of the mirror 5.

The block 7 is preferably formed of butyl rubber which has pressure sensitive adhesive qualities and will readily adhere to both the back of the mirror 6 and the mirrored surface of mirror 5. The butyl rubber in general has a specific gravity in the range of 1.24 to 1.58 (ASTM test procedure D217-60T), a pentarometer value of 7.23 to 9.16 mm, a rebound test of 0.280 to 0.565 mm and a Shore "00" hardness in the range of 63 to 65 at 72° F.

The adhesive block 7 and the periphery of the small mirror 6 can be enclosed by an annular shroud or casing, not shown, in order to provide added protection and a more attractive appearance.

The view of the small mirror 6 will be forward of the view of the mirror 5 and will be directed toward the rear left quarter of the vehicle, slightly ahead or forward of the view of the main mirror 5. Thus, the addition of the small mirror 6 will eliminate the "blind spot" so that the motorist can see oncoming vehicles at this position.

While the invention has been described as being associated with the side view mirror at the driver's side of the vehicle, it is also contemplated that the "blind spot" mirror can be associated with the side view mirror at the passenger side. In this instance the mirror may be somewhat larger in area and the angularity of the block 7 may be slightly different, depending upon the vehicle, to position the small mirror at the desired angle to eliminate the blind spot.

The device is inexpensive in that it consists merely of a flat mirror along with the adhesive block and does not require any complex curvatures for the mirror.

The mirror can be readily installed on the conventional side view mirror through use of the pressure sensitive adhesive block, and the pre-formed shape of the block positions the "blind spot" mirror at the desired angle.

While the description has illustrated the small mirror attached to a side view mirror, it is contemplated that the small mirror can be associated with the rear view mirror of the vehicle.

Various modes of carrying out the invention are contemplated as being within the scope of the following claims particularly pointing out and distinctly claiming the subject matter which is regarded as the invention.

I claim:

1. A mirrorr assembly to be attached to a vehicle, comprising a first mirror, a second flat mirror having an area substantially smaller than the first mirror, a wedge-shaped block of butyl rubber disposed between said mirrors and bonded to said mirrors, said butyl rubber having a pentarometer value of 7.23 to 9.16 mm, a rebound test value of 0.280 to 0.565 mm and a Shore "00"

hardness in the range of 63 to 65 at 72° F., said block having a configuration such that the second mirror is disposed at an acute angle with respect to said first mirror to enable the motorist to view an area forward of the normal line of vision of said first mirror and eliminate the "blind spot", said block having pressure sensitive adhesive properties to enable the block to be attached to both of said mirrors without the use of auxiliary adhesives.

2. The mirror assembly of claim 1, wherein said second mirror is positioned at an angle in the range of 15° to 20° with respect to the plane of the first mirror.

3. The mirror assembly of claim 1, wherein said block has a pair of opposite surfaces, one of said surfaces being attached to the first mirror and the second of said surfaces being attached to the second mirror, said surfaces diverging in a direction toward the vehicle.

* * * * *